United States Patent Office 3,515,730
Patented June 2, 1970

3,515,730
THENYL ESTERS OF CYCLOPROPANE-
CARBOXYLIC ACIDS
Masanao Matsui, Tokyo, Kenzo Ueda, Saitama-ken, Toshio Mizutani, Ikeda-shi, Nobushige Itaya and Shigeyoshi Kitamura, Minoo-shi, Akira Fujinami, Takarazuka-shi, Yositosi Okuno, Nishinomiya-shi, and Keimei Fujimoto, Kyoto, Japan, assignors to Sumitomo Chemical Company, Ltd., Osaka, Japan, a corporation of Japan
No Drawing. Filed Oct. 26, 1967, Ser. No. 678,219
Claims priority, application Japan, Jan. 13, 1967, 42/2,619; Feb. 6, 1967, 42/7,542
Int. Cl. A01n 9/12; C07d 63/12
U.S. Cl. 260—332.2
6 Claims

ABSTRACT OF THE DISCLOSURE

Novel thenyl esters of cyclopropanecarboxylic acids having insecticidal activities which are quick acting and harmless to mammals. These novel esters are prepared by esterifying cyclopropanecarboxylic acids having in the ring lower alkyl and methyl groups as substituents with thenyl alcohols having in the thiophene ring a halogen atom or an alkyl, benzyl, thenyl, furfuryl, alkanyl, alkadienyl or alkylene group. This esterification is effected by the reaction of said acids, or halides or anhydrides thereof, with said alcohols, or by the reaction of thenyl halides with said acids.

---

This invention relates to novel thiophene derivatives and, more particularly, to novel thenyl esters of cyclopropanecarboxylic acids having insecticidal activities, and a process for the production thereof. The invention is further concerned with insecticidal compositions containing said novel esters as active ingredients.

As insecticidal compounds which are quick acting and harmless to mammals, pyrethrum extracts and synthetic allethrins have been most useful. Despite their usefulness, however, the above compounds are restricted in uses because of their being relatively expensive.

The present invention aims to provide at low costs novel compounds which are excellent in insecticidal acting as compared with the conventional chrysanthemates and are harmless to mammals.

In accordance with the present invention, there are provided novel compounds represented by the general formula,

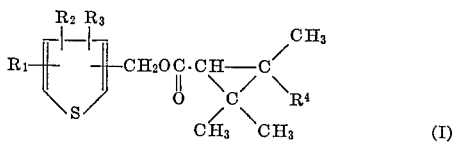

(I)

wherein $R_1$ is a lower alkyl, alkenyl, alkadienyl, benzyl, furfuryl or thenyl group or a halogen atom, each of said benzyl, furfuryl and thenyl groups may be nuclear substituted with a lower alkyl group; $R_2$ and $R_3$ are individually a hydrogen or halogen atom or an alkyl group, and in case both $R_1$ and $R_2$ are alkyl groups, the two may be bonded each other at the terminals to form an alkylene group; and $R_4$ is a hydrogen atom or a methyl group.

The present inventors found that the compounds of the general Formula I have excellent insecticidal effects not only on sanitary injurious insects and horticultural injurious insects but also on general agricultural injurious insects. Based on the above finding, the inventors have accomplished the present invention.

The novel thiophene derivatives of the present invention are prepared by the reaction of thenyl compound represented by the general formula,

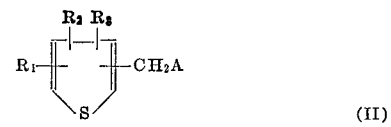

(II)

wherein $R_1$, $R_2$ and $R_3$ have the same significances as mentioned above, and A is hydroxy or halogen atom with cyclopropanecarboxylic acids represented by the general formula,

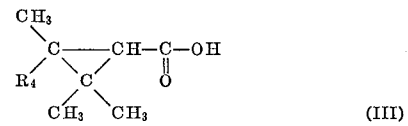

(III)

wherein $R_4$ has the same significance as mentioned above, or acid chloride, acid anhydride, lower alkyl ester, alkali metal or tertiary amine salt of the said acid (III). Most of the thenyl alcohols represented by the general Formula II are novel compounds. They are obtained by reducing corresponding aldehydes, carboxylic acids or esters thereof according to ordinary procedures. They may also be obtained with ease by the hydrolysis of halides or esters of said thenyl alcohols. The reaction of thenyl alcohols with cyclopropanecarboxylic acid halides is effected in the presence of a deacidifying agent. The reaction is desirably carried out at or below room temperature. The use of inert solvent is not indispensable but is desirable for smooth progress of the reaction. As the deacidifying agent, an organic tertiary base is preferred, but a carbonate of an alkali metal or alkaline earth metal may also be used.

The reaction of halides of the alcohols of the general Formula II, i.e., thenyl halides represented by the general formula,

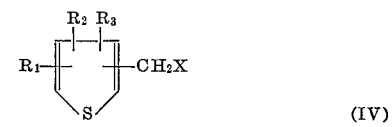

(IV)

wherein $R_1$, $R_2$ and $R_3$ have the same significances as mentioned above; and X is a halogen atom, with the abovementioned carboxylic acids is effected in the presence of a basic condensing agent. In the above reaction, the use of solvent is not indispensable, but an inert solvent such as acetone or methylisobutylketone is desirably used for smooth progress of the reaction. As the basic condensing agent, there is used a tertiary organic base such as triethylamine, pyridine or diethylaniline, or a hydroxide or carbonate of an alkali metal or alkaline earth metal. In case the tertiary organic base is to be used, it may be previously reacted with the halide or carboxylic acid, but it is more advantageous to mix and react the three members simultaneously. On the other hand, in case the inorganic hydroxide or carbonate is to be used, the three members may be simultaneously mixed and reacted, but it is more advantageous to previously react said salt with the carboxylic acid to form a salt.

In producing the thiophene derivatives represented by the general Formula I by reacting the thenyl alcohols represented by the general Formula II with anhydrides of the carboxylic acids represented by the general Formula III, it is advantageous for the shortening of reaction time to effect the reaction with reflux at an elevated temperature in an inert solvent such as toluene or xylene, though the reaction proceeds at room temperature as well.

Further, the reaction of the thenyl alcohols represented by the general Formula II with the carboxylic acids represented by the general Formula III smoothly progresses at room temperature in the presence of a dehydrating agent such as dicyclohexyl carbodiimide, preferably in an inert solvent such as methylene chloride, benzene or toluene.

Typical examples of the thenyl alcohols represented by the general Formula II, which are employed in the invention, are as shown below, but the scope of the invention is not limited thereto.

5-methyl-2-thenyl alcohol
4,5-dimethyl-2-thenyl alcohol
2,5-dimethyl-3-thenyl alcohol
2,4,5-trimethyl-3-thenyl alcohol
5-chloro-2-thenyl alcohol
4,5-dichloro-2-thenyl alcohol
2,4,5-trichloro-3-thenyl alcohol
2,5-dichloro-3-thenyl alcohol
4,5-tetramethylene-2-thenyl alcohol
2-methyl-4,5-tetramethylene-3-thenyl alcohol
5-benzyl-3-thenyl alcohol
5-benzyl-2-thenyl alcohol
2-methyl-5-benzyl-3-thenyl alcohol
5-methyl-4-benzyl-2-thenyl alcohol
5-(4'-methylbenzyl)-2-thenyl alcohol
5-thenyl-2-thenyl alcohol
5-(5'-methylthenyl)-2-thenyl alcohol
5-thenyl-2-methyl-3-thenyl alcohol
5-allyl-2-methyl-3-thenyl alcohol
3,5-dichloro-2-thenyl alcohol
3,4,5-trichloro-2-thenyl alcohol
3,5-dimethyl-2-thenyl alcohol
5-benzyl-3-methyl-2-thenyl alcohol
5-allyl-2-thenyl alcohol Among the thiophene derivatives obtained according to the present process, there are those having various stereoisomers. It is, however, needless to say that all the stereoisomers having plane structures represented by the general Formula I are involved in the scope of the present invention.

The following examples illustrate the procedures for the preparation of the novel compounds of the present invention.

EXAMPLE 1

2.6 g. of 5-methyl-2-thenyl alcohol and 2.4 g. of dry pyridine were dissolved in 20 ml. of dry benzene. To the solution was added a solution of 3.2 g. of 2,2,3,3-tetramethylcyclopropane-1-carboxylic acid chloride in 10 ml. of dry benzene. The mixed solution was thoroughly shaken, was tightly sealed in a container and was allowed to stand overnight at room temperature. On the next day, the reaction liquid was washed successively with 5% hydrochloric acid, 5% aqueous sodium carbonate solution and saturated sodium chloride water, was dried with anhydrous magnesium sulfate and was freed from the solvent by distillation, whereby a yellow oily substance was formed. The oily substance was purified by flowing down through an alumina packed column to obtain 4.6 g. of 5-methyl-2-thenyl 2,2,3,3-tetramethylcyclopropane-1-carboxylate, $n_D^{25}$ 1.5122.

*Elementary analysis.*—Calc'd for $C_{14}H_{20}O_2S$ (percent): C, 66.6; H, 8.0; S, 12.7. Found (percent): C, 66.7; H, 8.0; S, 12.6.

EXAMPLE 2

2.8 g. of 4,5-dimethyl-2-thenyl alcohol and 5.4 g. of 2,2,3,3-tetramethylcyclopropane-1-carboxylic anhydride were dissolved in 50 ml. of toluene, and the solution was heated and refluxed for 4 hours. After cooling, the reaction liquid was washed successively with 5% aqueous sodium carbonate solution and saturated sodium chloride water, was dried with anhydrous magnesium sulfate, was freed from toluene by distillation, and was purified by flowing down through an alumina-packed column to obtain 4.7 g. of colorless, viscous, oily 4,5-dimethyl-2-thenyl 2,2,3,3-tetramethylcyclopropane-1-carboxylate, $n_D^{25}$ 1.5125.

*Elementary analysis.*—Calc'd for $C_{15}H_{22}O_2S$ (percent): C, 67.6; H, 8.3; S, 12.0. Found (percent): C, 67.7; H, 8.4; S, 12.0.

EXAMPLE 3

3.2 g. of 2,5-dimethyl-3-thenyl chloride and 2.9 g. of 2,2,3,3-tetramethylcyclopropane-1-carboxylic acid were dissolved in 30 ml. of methylisobutylketone. The solution was charged with 3.3 g. of triethylamine and was heated and refluxed for 10 hours. After cooling, the reaction liquid was washed successively with 5% hydrochloric acid, 5% aqueous sodium carbonate solution and saturated sodium chloride water, was dried with anhydrous magnesium sulfate, was freed from the solvent by distillation and was then purified by flowing down through an alumina-picked column to obtain 4.8 g. of 2,5-dimethyl-3-thenyl 2,2,3,3-tetramethylcyclopropane-1-carboxylate. $n_D^{25}$ 1.5122.

*Elementary analysis.*—Calc'd for $C_{15}H_{22}O_2S$ (percent): C, 67.6; H, 8.3; S, 12.0. Found (percent): C, 67.6; H, 8.4; S, 12.1.

EXAMPLE 4

1.4 g. of 3,5-dimethyl-2-thenyl alcohol and 1.4 g. of 2,2,3,3-tetramethylcyclopropane-1-carboxylic acid were dissolved in 40 ml. of methylene dichloride. The solution was charged with 3 g. of dicyclohexyl carbodiimide and was then allowed to stand overnight at room temperature. On the next day, deposited dicyclohexylurea was separated by filtration, and the reaction liquid was washed successively with 5% aqueous sodium carbonate solution and saturated sodium chloride water, was dried with anhydrous sodium sulfate and was then freed from the solvent by reduced pressure distillation to obtain 2.3 g. of 3,5-dimethyl-2-thenyl 2,2,3,3-tetramethylcyclopropane-1-carboxylate, $n_D^{25}$ 1.5146.

*Elementary analysis.*—Calc'd for $C_{15}H_{22}O_2S$ (percent): C, 67.6; H, 8.3; S, 12.0. Found (percent): C, 67.6; H, 8.4; S, 12.0.

EXAMPLE 5

4.0 g. of 5-benzyl-2-thenyl alcohol and 3.2 g. of 2,2,3,3-tetramethylcyclopropane-1-carboxylic acid chloride were treated in the same manner as in Example 1 to obtain 6.1 g. of 5-benzyl-2-thenyl 2,2,3,3-tetramethylcyclopropane-1-carboxylate, $n_D^{25}$ 1.5470.

*Elementary analysis.*—Calc'd for $C_{20}H_{24}O_2S$ (percent): C, 73.1; H, 7.4; S, 9.8. Found (percent): C, 73.0; H, 7.4; S, 9.7.

EXAMPLE 6

2.0 g. of 5-benzyl-2-thenyl alcohol and 1.5 g. of 2,3,3-trimethylcyclopropane-1-carboxylic acid chloride were treated in the same manner as in Example 1 to obtain 2.7 g. of 5-benzyl-2-thenyl 2,3,3-trimethylcyclopropane-1-carboxylate, $n_D^{25}$ 1.5477.

*Elementary analysis.*—Calc'd for $C_{19}H_{22}O_2S$ (percent): C, 72.6; H, 7.1; S, 10.2. Found (percent): C, 72.5; H, 7.1; S, 10.1.

EXAMPLE 7

1.4 g. of 4,5-dimethyl-2-thenyl alcohol and 1.5 g. of 2,3,3-trimethylcyclopropane-1-carboxylic acid chloride were treated in the same manner as in Example 1 to obtain 2.3 g. of 4,5-dimethyl-2-thenyl 2,3,3-trimethylcyclopropane-1-carboxylate, $n_D^{25}$ 1.5140.

*Elementary analysis.*—Calc'd for $C_{14}H_{20}O_2S$ (percent): C, 66.6; H, 8.0; S, 12.7. Found (percent): C, 66.4; H, 8.0; S, 12.7.

EXAMPLE 8

2.0 g. of 5-benzyl-3-thenyl alcohol and 1.6 g. of 2,2,3,3-tetramethylcyclopropane-1-carboxylic acid chloride were treated in the same manner as in Example 1 to obtain 2.9 g. of 5-benzyl-3-thenyl 2,2,3,3-tetramethylcyclopropane-1-carboxylate, $n_D^{25}$ 1.5438.

*Elementary analysis.*—Calc'd for $C_{20}H_{24}O_2S$ (percent): C, 73.1; H, 7.4; S, 9.8. Found (perecent): C, 73.0; H, 7.3; S, 9.6.

EXAMPLE 9

2.2 g. of 5-benzyl-2-methyl-3-thenyl alcohol and 1.6 g. of 2,2,3,3-tetramethylcyclopropane-1-carboxylic acid chloride were treated in the same manner as in Example 1 to obtain 3.2 g. of 5-benzyl-2-methyl-3-thenyl 2,2,3,3-tetramethylcyclopropane-1-carboxylate, $n_D^{25}$ 1.5431.

*Elementary analysis.*—Calc'd for $C_{21}H_{26}O_2S$ (percent): C, 73.6; H, 7.7; S, 9.4. Found (percent): C, 73.7; H, 7.7; S, 9.4.

EXAMPLE 10

2.2 g. of 4-benzyl-5-methyl-2-thenyl alcohol and 1.6 g. of 2,2,3,3-tetramethylcyclopropane-1-carboxylic acid chloride were treated in the same manner as in Example 1 to obtain 3.2 g. of 4-benzyl-5-methyl-2-thenyl 2,2,3,3-tetramethylcyclopropane-1-carboxylate, $n_D^{25}$ 1.5527.

*Elementary analysis.*—Calc'd for $C_{21}H_{26}O_2S$ (percent): C, 73.6; H, 7.7; S, 9.4. Found (percent): C, 73.6; H, 7.7; S, 9.2.

EXAMPLE 11

2.3 g. of 4-(4'-methylbenzyl)-5-methyl-2-thenyl alcohol and 1.6 g. of 2,2,3,3-tetramethylcyclopropane-1-carboxylic acid chloride were treated in the same manner as in Example 1 to obtain 3.1 g. of 4-(4'-methylbenzyl)-5-methyl-2-thenyl 2,2,3,3-tetramethylcyclopropane-1-carboxylate, $n_D^{25}$ 1.5554.

*Elementary analysis.*—Calc'd for $C_{22}H_{28}O_2S$ (percent): C, 74.1; H, 7.9; S, 9.0. Found (percent): C, 74.2; H, 7.9; S, 8.9.

EXAMPLE 12

1.7 g. of 4,5-tetramethylene-2-thenyl alcohol and 1.6 g. of 2,2,3,3-tetramethylcyclopropane-1-carboxylic acid chloride were treated in the same manner as in Example 1 to obtain 2.5 g. of 4,5-tetramethylene-2-thenyl 2,2,3,3-tetramethylcyclopropane-1-carboxylate, $n_D^{25}$ 1.5286.

*Elementary analysis.*—Calc'd for $C_{17}H_{24}O_2S$ (percent): C, 69.8; H, 8.3; S, 11.0. Found (percent): C, 69.7; H, 8.4; S, 10.9.

EXAMPLE 13

1.8 g. of 4,5-dichloro-2-thenyl alcohol and 1.6 g. of 2,2,3,3-tetramethylcyclopropane-1-carboxylic acid chloride were treated in the same manner as in Example 1 to obtain 2.6 g. of 4,5-dichloro-2-thenyl 2,2,3,3-tetramethylcyclopropane-1-carboxylate, $n_D^{25}$ 1.5293.

*Elementary analysis.*—Calc'd for $C_{13}H_{16}O_2Cl_2S$ (percent): C, 50.8; H, 5.3; S, 10.4. Found (percent): C, 50.6; H, 5.4; S, 10.2.

EXAMPLE 14

2.3 g. of 5-(5'-methyl-2'-thenyl)-2-thenyl alcohol and 1.6 g . of 2,2,3,3-tetramethylcyclopropane-1-carboxylic acid chloride were treated in the same manner as in Example 1 to obtain 3.0 g. of 5-(5'-methyl-2'-thenyl)-2-thenyl 2,2,3,3-tetramethylcyclopropane-1-carboxylate, $n_D^{25}$ 1.5486.

*Elementary analysis.*—Calc'd for $C_{19}H_{24}O_2S_2$ (percent): C, 65.5; H, 6.9; S, 18.4. Found (percent): C, 65.3; H, 6.9; S, 18.3.

EXAMPLE 15

2.2 g. of 3,4,5-trichloro-2-thenyl alcohol and 1.6 g. of 2,2,3,3-tetramethylcyclopropane-1-carboxylic acid chloride were treated in the same manner as in Example 1 to obtain 3.1 g. of 3,4,5-trichloro-2-thenyl 2,2,3,3-tetramethylcyclopropane-1-carboxylate, $n_D^{25}$ 1.5387.

*Elementary analysis.*—Calculated for $C_{23}H_{15}Cl_3O_2S$ (percent): C, 45.7; H, 4.4; S, 9.4. Found (percent): C, 45.8; H, 4.4; S, 9.0.

EXAMPLE 16

2.2 g. of 2,4,5-trichloro-3-thenyl alcohol and 1.6 g. of 2,2,3,3-tetramethylcyclopropane-1-carboxylic acid chloride were treated in the same manner as in Example 1 to obtain 3.0 g. of 2,4,5-trichloro-3-thenyl 2,2,3,3-tetramethylcyclopropane-1-carboxylate, $n_D^{25}$ 1.5059.

*Elementary analysis.* — Calculated for $C_{13}H_{15}Cl_3O_2S$ (percent): C, 45.7; H, 4.4; S, 9.4. Found (percent): C, 45.9; H, 4.6; S, 9.0.

EXAMPLE 17

1.4 g. of 5-ethyl-2-thenyl alcohol and 1.6 g. of 2,2,3,3-tetramethylcyclopropane-1-carboxylic acid chloride were treated in the same manner as in Example 1 to obtain 2.4 g. of 5-ethyl-2-thenyl 2,2,3,3-tetramethylcyclopropane-1-carboxylate, $n_D^{25}$ 1.5121.

*Elementary analysis.*—Calc'd for $C_{15}H_{22}O_2S$ (percent): C, 67.6; H, 8.3; S, 12.0. Found (percent): C, 67.9; H, 8.3; S, 12.1.

EXAMPLE 18

1.6 g. of 4-methyl-5-ethyl-2-thenyl alcohol and 1.6 g. of 2,2,3,3-tetramethylcyclopropane-1-carboxylic acid chloride were treated in the same manner as in Example 1 to obtain 2.6 g. of 4-methyl-5-ethyl-2-thenyl 2,2,3,3-tetramethylcyclopropane-1-carboxylate, $n_D^{25}$ 1.5098.

*Elementary analysis.*—Calc'd for $C_{16}H_{24}O_2S$ (percent): C, 68.5; H, 8.6; S, 11.4. Found (percent): C, 68.6; H, 8.4; S, 10.9.

EXAMPLE 19

1.7 g. of 4,5-diethyl-2-thenyl alcohol and 1.6 g. of 2,2,3,3-tetramethylcyclopropane-1-carboxylic acid chloride were treated in the same manner as in Example 1 to obtain 2.5 g. of 4,5-diethyl-2-thenyl 2,2,3,3-tetramethylcyclopropane-1-carboxylate, $n_D^{25}$ 1.5063.

*Elementary analysis.*—Calc'd for $C_{17}H_{25}O_2S$ (percent): C, 69.3; H, 8.9; S, 10.9. Found (percent): C, 69.0; H, 9.3; S, 10.8.

EXAMPLE 20

1.5 g. of 5-allyl-2-thenyl alcohol and 1.6 g. of 2,2,3,3-tetramethylcyclopropane-1-carboxylic acid chloride were treated in the same manner as in Example 1 to obtain 2.6 g. of 5-allyl-2-thenyl 2,2,3,3-tetramethylcyclopropane-1-carboxylate, $n_D^{25}$ 1.5231.

*Elementary analysis.*—Calc'd for $C_{16}H_{22}O_2S$ (percent): C, 69.0; H, 8.0; S, 11.5. Found (percent): C, 69.3; H, 7.9; S, 11.6.

EXAMPLE 21

2.1 g. of 5-(2'thenyl)-2-thenyl alcohol and 1.6 g. of 2,2,3,3-tetramethylcyclopropane-1-carboxylic acid chloride were treated in the same manner as in Example 1 to obtain 3.0 g. of 5-(2'-thenyl)-2-thenyl 2,2,3,3-tetramethylcyclopropane-1-carboxylate, $n_D^{25}$ 1.5540.

*Elementary analysis.*—Calc'd for $C_{18}H_{22}O_2S_2$ (percent): C, 64.6; H, 6.6; S, 19.2. Found (percent): C, 65.0; H, 6.7; S, 18.9.

EXAMPLE 22

1.9 g. of 5-(2'-furfuryl)-2-thenyl alcohol and 1.6 g. of 2,2,3,3-tetramethylcyclopropane-1-carboxylic acid chloride were treated in the same manner as in Example 1 to obtain 2.8 g. of 5-(2'-furfuryl)-2-thenyl 2,2,3,3-tetramethylcyclopropane carboxylate, $n_D^{25}$ 1.5293.

*Elementary analysis.*—Calc'd for $C_{18}H_{22}O_3S$ (percent): C, 67.9; H, 7.0; S, 10.1. Found (percent): C, 67.9; H, 7.1; S, 10.4.

There are no insecticides available at present, which are quick acting, harmless to mammals and usable without anxiety, other than pyrethrum extracts (containing pyrethrin) or synthetic allethrins which are homologs of the active ingredient of said pyrethrum extracts. Despite their usefulness, however, the pyrethrum extracts and the like are liable to be restricted in uses due to their being relatively expensive.

Unlike pyrethrins, allethrins and the like compounds which contain chrysanthemic acid as active ingredient, the thiophene derivatives of the present invention can be prepared at low costs, as mentioned above, are well comparable in effectiveness to chrysanthemate type insecticides, and not only show insecticidal activity against sanitary injurious insects such as houseflies, mosquitos, cockroaches and the like but also are low toxic to mammals.

In view of the above characteristics, insecticidal compositions containing as active ingredients the present thiophene derivatives represented by the general Formula I find a wide scope of uses particularly for prevention of epidemics. In addition thereto, said compositions show excellent insecticidal activity against insects injurious to stored cereals, agriculture and forest, and hence are markedly useful for the prevention and extermination of said injurious insects. Further, due particularly to their low toxicity, the compositions are also excellent in that they are freely usable for crops before harvest, home horticulture, greenhouse cultivation and packing materials for foods.

Of the compounds represented by the aforesaid general Formula I, particularly useful for the object of the present invention are those shown below, but it is needless to say that the present invention is not limited only to these.

| Compound No. | Structure |
|---|---|

(1)

5-benzyl-2-thenyl 2,2,3,3-tetramethylcyclopropane-1-carboxylate (2)

4,5-dimethyl-3-thenyl 2,2,3,3-tetramethylcyclopropane-1-carboxylate (3) 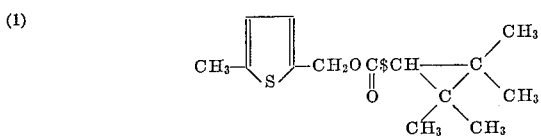

2,5-dimethyl-3-thenyl 2,2,3,3-tetramethylcyclopropane-1-carboxylate (4) 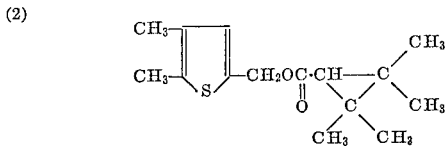

3,5-dimethyl-2-thenyl 2,2,3,3-tetramethylcyclopropane-1-carboxylate (5) 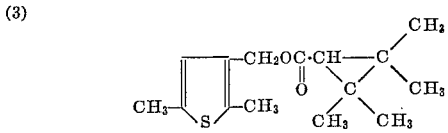

5-benzyl-2-thenyl 2,2,3,3-tetramethylcyclopropane-1-carboxylate (6) 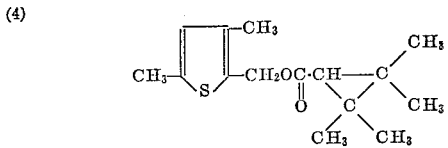

5-benzyl-2-thenyl 2,3,3-tetramethylcyclopropane-1-carboxylate (7) 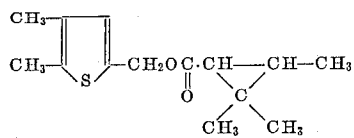

4,5-dimethyl-2-thenyl 2,3,3-trimethylcyclopropane-1-carboxylate (8) 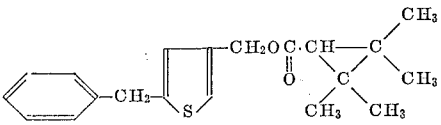

5-benzyl-3-thenyl 2,2,3,3-tetramethylcyclopropane-1-carboxylate (9) 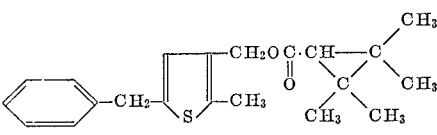

2-methyl-5-benzyl-3-thenyl 2,2,3,3-tetramethyl-cyclopropane-1-carboxylate

(10) 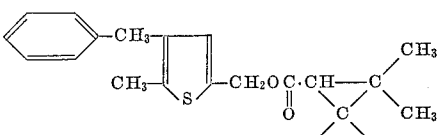

4-benzyl-5-methyl-2-thenyl 2,2,3,3-tetramethyl-cyclopropane-1-carboxylate

(11) 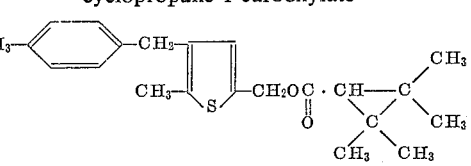

4-(4'-methylbenzyl)-5-methyl-2-thenyl 2,2,3,3-tetramethylcyclopropane-1-carboxylate

(12) 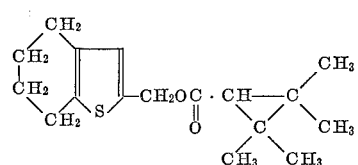

4,5-tetramethylene-2-thenyl 2,2,3,3-tetramethyl-cyclopropane-1-carboxylate

(13) 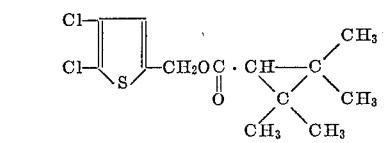

4,5-dichloro-2-thenyl 2,2,3,3-tetramethylcyclopropane-1-carboxylate

(14) 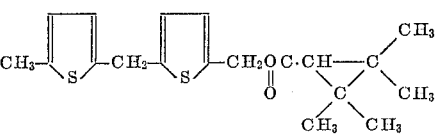

5-(5'-methyl-2'-thenyl)-2-thenyl 2,2,3,3-tetramethyl-cyclopropane-1-carboxylate

(15) 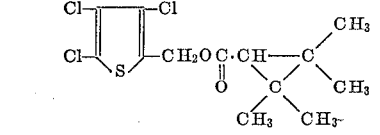

3,4,5-trichloro-2-thenyl 2,2,3,3-tetramethyl-
cyclopropane-1-carboxylate

(16)
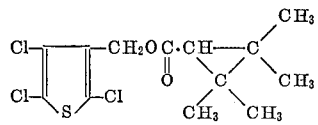

2,4,5-trichloro-3-thenyl 2,2,3,3-tetramethyl-
cyclopropane-1-carboxylate

(17)
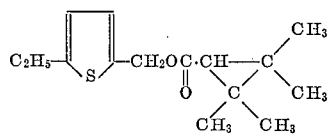

5-ethyl-2-thenyl 2,2,3,3-tetramethylcyclopropane-
1-carboxylate

(18)
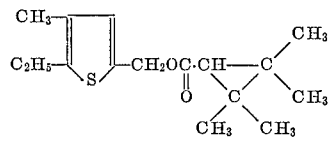

4-methyl-5-ethyl-2-thenyl 2,2,3,3-tetramethyl-
cyclopropane-1-carboxylate

(19)
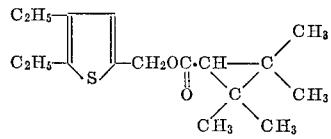

4,5-diethyl-2-thenyl 2,2,3,3-tetramethylcyclopro-
pane-1-carboxylate

(20)
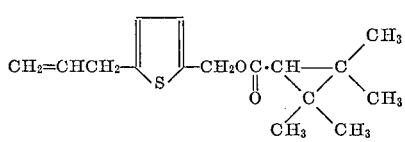

5-allyl-2-thenyl 2,2,3,3-tetramethylcyclopropane-
1-carboxylate

(21)
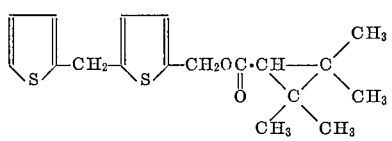

5-(2'-thenyl)-2-thenyl-2,2,3,3-tetramethyl-
cyclopropane-1-carboxylate

(22)
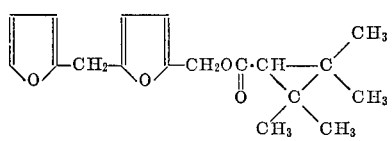

5-(2'-furfuryl)-2-thenyl 2,2,3,3-tetramethyl-
cyclopropane-1-carboxylate

The present compositions may be formulated, as occasion demands, into any forms of oil solutions, oil sprays, emulsifiable concentrates, dusts, wettable powders, aerosols, mosquito coil, baits, fumigants and granular preparations, according to processes thoroughly known to those skilled in the art, using diluting adjuvants for common insecticides. Further, they may be formulated into death-inducing powdery or solid preparations incorporated with baits or other materials attractive for injurious insects.

The present insecticides may be increased in insecticidal effects when used in admixture with α-[2-(2-butoxy-ethoxy)-ethoxy]-4,5-methylenedioxy - 2 - propyletoluene (hereinafter referred to as "piperonyl butoxide"), 1,2-methylenedioxy-4-[2 - (octylsulfinyl) - propyl] - benzene (hereinafter referred to as "sulfoxide"), N-(2-ethylhexyl)-bicyclo-(2,2,1)-hepta-5-ene-anhydrophthalic acid - 2,3-dicarboxy-imide (hereinafter referred to as "MGK—264", registered trade name for said imide produced by McRolin Gormley King Co.) or the like synergist for pyrethroides. When the present compounds are formulated into mosquito coil, the insectidal effects of the mosquito coil can be increased by incorporation of 3,4-methylenedioxybenzoic acid, 2,6-ditert.butyl-4-methylphenol, benezene-para-dicarboxylic acid, benzenemeta-dicarboxylic acid, para-tert. butyl-benzoic acid, siperonyl para-tert. butylbenzoate, 1-methyl-2-carboxy - 4 - isopropylcyclohexanone - (3), 3-methoxy-4-hydrobenzoic acid, or 2-isopropyl-4-acetyl-valeric acid. In addition, the present compounds may be formulated into multipurpose compositions by incorporation of other active ingredients such as, for example, pyrethroide type insecticides, organo-phosphorus type insecticides, e.g., 0,0-dimethyl-0-(3-methyl-4-nitrophenyl) thiophosphate (hereinafter referred to as "Sumithion," registered trade name for said compound produced by Sumitomo Kagaku K.K.), 0-0-dimethyl-2-2-dichlorovinyl phosphate (hereinafter referred to as "DDVP"), 0-0-diethyl-0-(2 - isopropyl-4-methyl-6-pyrimidyl) phosphorothioate (hereinafter referred to as "diazinon"), or 0,0-dimethyl-0 - (3 - methyl-4 - methylthio) phosphorothioate (hereinafter referred to as "Baytex"), organo-chlorine type insecticides, carbamate type insecticides or the like insecticides, fungicides, miticides, herbicides, fertilizers and other agricultural chemicals.

The preparation and effects of the present compositions will be illustrated in detail below with reference to examples and test examples, but the scope of the present invention is by no means limited only to the examples. In the examples, the names of compounds are represented by the numbers of the compounds exemplified previously.

EXAMPLE 1

0.6 part of the present compound (1) was dissolved in kerososene to make 100 parts, whereby an oil spray was obtained.

EXAMPLE 2

20 parts of the present compound (1), 10 parts of Sorpol SM–200 (registered trade name for an emulsifier produced by Toho Kagaku K.K.) and 70 parts of xylene were mixed, stirred and dissolved together to obtain an emulsifiable concentrate.

EXAMPLE 3

0.15 part of the present compound (2) was dissolved in kerosene to make 100 parts, whereby an oil spray was obtained.

EXAMPLE 4

5 parts of the present compound (2) was mixed with 5 parts of Toyolignin CT (registered trade name for a product of Toyo Boseki K.K.) and 90 parts of GSM clay (registered trade name for a clay produced by Zieklite Kogyo K.K.), and the mixture was thoroughly stirred in a mortar. Subsequently, the mixture was charged with water in an amount of 10% based on the mixture, was further stirred, was granulated by means of a granulator and was then air-dried to obtain a granular preparation.

EXAMPLE 5

0.8 g. of the present compound (2) was dissolved in 20 ml. of methanol. The solution was homogeneously mixed with 99.2 g. of mosquito coil carrier (a 5:3:1 mixture of Tabu powder, Pyrethrum marc and wood powder). After vaporizing methanol, the mixture was charged with 150 ml. of water and was thoroughly kneaded. The thus kneaded mixture was shaped and dried to obtain a mosquito coil.

EXAMPLE 6

0.5 part of the present compound (3) was dissolved in kerosene to make 100 parts, whereby an oil spray was obtained.

EXAMPLE 7

25 parts of the present compound (3) was thoroughly mixed with Sorpol SM-200. The mixture was charged with 70 parts of 300 mesh talc and was thoroughly stirred in a mortar to obtain a wettable powder.

EXAMPLE 8

0.4 part of the present compound (4) was dissolved in kerosene to make 100 parts, whereby an oil spray was obtained.

EXAMPLE 9

0.05 part of the present compound (5) was dissolved in kerosene to make 100 parts, whereby an oil spray was obtained.

EXAMPLE 10

20 parts of the present compound (5), 10 parts of Sorpol SM-200 and 70 parts of xylene were mixed, stirred and dissolved to obtain an emulsifiable concentrate.

EXAMPLE 11

0.4 part of the present compound (5), 0.2 part of N-(3,4,5,6 - tetrahydrophthalimide-methyl chrysanthemate) (hereinafter referred to as "phthalthrin"), 7 parts of xylene and 7.4 parts of deodorized kerosene were mixed and dissolved together. The thus prepared solution was filled in an aerosol container. After attaching a valve portion to the container, 85 parts of a prepellant (e.g., Freon, vinyl chloride monomer or liquefied petroleum gas) was charged therein under pressure to obtain an aerosol.

EXAMPLE 12

2 parts of the present compound (2) was dissolved in 20 parts of acetone. To the solution, 98 parts of 300 mesh diatomaceous earth was added. The mixture was thoroughly stirred in a mortar and was freed from acetone by vaporization to obtain a dust.

EXAMPLE 13

0.5 g. of the present compound (5) was dissolved in 20 ml. of methanol, The solution was homogeneously mixed with 99.5 g. of a mosquito coil carrier (a 5:3:1 mixture of Tabu powder, Pyrethrum marc and wood powder). After varporizing methanol, the mixture was charged with 150 ml. of water and was thoroughly kneaded. The thus kneaded mixture was shaped and dried to obtain a mosquito coil.

EXAMPLE 14

0.5 part of the present compound (6) was dissolved in kerosene to make 100 parts, whereby an oil spray was obtained.

EXAMPLE 15

0.5 part of the present compound (7) and 2 parts of piperonyl butoxide were dissolved in kerosene to make 100 parts, whereby an oil spray was obtained.

EXAMPLE 16

0.3 part of the present compound (8) was dissolved in kerosene to make 100 parts, whereby an oil spray was obtained.

EXAMPLE 17

0.6 part of the present compound (9) was dissolved in kerosene ot make 100 parts whereby an oil spray was obtained.

EXAMPLE 18

15 parts of the present compound (9), 5 parts of Sumithion, 10 parts of Sorpol 2020 (registered trade name for an emulsifier produced by Toho Kagaku K.K.) and 70 parts of xylene were mixed, stirred and dissolved together to obtain an emulsifiable concentrate.

EXAMPLE 19

0.4 part of the present compound (10) was dissolved in kerosene to make 100 parts, whereby an oil spray was obtained.

EXAMPLE 20

0.5 part of the present compound (11) and 0.1 part of DDVP were dissolved in kerosene to make 100 parts to obtain an oil spray.

EXAMPLE 21

0.05 part of the present compound (12) was dissolved in kerosene to make 100 parts, whereby an oil spray was obtained.

EXAMPLE 22

20 parts of the present compound (12), 10 parts of Sorpol 2020 and 70 parts of xylene were mixed, stirred and dissolved together to obtain an emulsifiable concentrate.

EXAMPLE 23

25 parts of the present compound (12) and 5 parts of Sorpol SM-200 were thoroughly mixed together. The mixture was charged with 70 parts of 300 mesh talc and was thoroughly stirred in a mortar to obtain a wettable powder.

EXAMPLE 24

2 parts of the present compound (12) was dissolved in 20 parts of acetone. To the solution, 98 parts of 300 mesh diatomaceous earth was added. The resulting mixture was thoroughly stirred in a mortar and was then freed from acetone by vaporization to obtain a dust.

EXAMPLE 25

0.5 g. of the present compound (12) was dissolved in 20 ml. of methanol. The solution was homogeneously mixed with 99.5 g. of a mosquito coil carrier (a 5:3:1 mixture of Tabu powder, Pyrethrum marc and wood powder). After vaporizing methanol, the mixture was charged with 150 ml. of water and was thoroughly kneaded. The kneaded mixture was shaped and dried to obtain a mosquito coil.

EXAMPLE 26

0.3 part of the present compound (12), 0.2 part of phthalthrin, 13.5 parts of deodorized kerosene and 1 part of Atmos 300 (registered trade name for an emulsifier produced by Atlas Chemical Co.) were mixed together. The resulting mixture was emulsified by addition of 50 parts of pure water and was then filled in an aerosol container together with a 3:1 mixture of deodorized butane and deodorized propane, whereby a water based aerosol was obtained.

EXAMPLE 27

0.4 part of the present compound (13) and 0.1 part of Sumithion were dissolved in kerosene to make 100 parts, whereby an oil spray was obtained.

EXAMPLE 28

20 parts of the present compound (13), 10 parts of Sorpol SM-200 and 70 parts of xylene were mixed, stirred and dissolved together to obtain an emulsifiable concentrate.

EXAMPLE 29

0.2 part of the present compound (14) was dissolved in kerosene to make 100 parts, whereby an oil spray was obtained.

EXAMPLE 30

20 parts of the present compound (14), 10 parts of Sorpol SM-200 and 70 parts of xylene were mixed, stirred and dissolved together to obtain an emulsifiable concentrate.

EXAMPLE 31

0.3 part of the present compound (15) was dissolved in kerosene to make 100 parts, whereby an oil spray was obtained.

EXAMPLE 32

15 parts of the present compound (16), 10 parts of Sorpol SM-200 and 75 parts of xylene were mixed, stirred and dissolved together to obtain an emulsifiable concentrate.

EXAMPLE 33

0.1 part of the present compound (17) was dissolved in kerosene to make 100 parts, whereby an oil spray was obtained.

EXAMPLE 34

0.2 part of the present compound (18) was dissolved in kerosene to make 100 parts, whereby an oil spray was obtained.

EXAMPLE 35

0.3 part of the present compound (19) was dissolved in kerosene to make 100 parts, whereby an oil spray was obtained.

EXAMPLE 36

0.1 part of the present compound (20) was dissolved in kerosene to make 100 parts, whereby an oil spray was obtained.

EXAMPLE 37

0.2 part of the present compound (20), 0.2 part of phthalthrin, 7.1 parts of xylene and 7.5 parts of deodorized kerosene were mixed and dissolved together. The solution was filled in an aerosol container and the same procedure as in Example 11 was effected to obtain an aerosol.

EXAMPLE 38

0.5 g. of the present compound (20) was dissolved in 20 ml. of methanol. The solution was homogeneously mixed with 99.5 g. of a mosquito coil carrier (a 5:3:1 mixture of Tabu powder, Pyrethrum marc and wood powder). After vaporizing methanol, the mixture was charged with 150 ml. of water and was thoroughly kneaded. The thus kneaded mixture was shaped and dried to obtain a mosquito coil.

EXAMPLE 39

10 parts of the present compound (20), 10 parts of Sorpol SM-200 and 80 parts of xylene were mixed, stirred and dissolved together to obtain an emulsifiable concentrate.

EXAMPLE 40

0.05 part of the present compound (21) was dissolved in kerosene to make 100 parts, whereby an oil spray was obtained.

EXAMPLE 41

0.2 part of the present compound (21), 0.2 part of phthalthrin, 7.1 parts of xylene and 7.5 parts of deodorized kerosene were mixed and dissolved together. The solution was filled in an aerosol container, and the same procedure as in Example 11 was effected to obtain an aerosol.

EXAMPLE 42

0.5 g. of the present compound (21) was dissolved in 20 ml. of methanol. The solution was homogeneously mixed with 99.5 g. of a mosquito coil carrier (a 5:3:1 mixture of Tabu powder, Pyrethrum marc and wood powder). After vaporizing methanol, the mixture was charged with 150 ml. of water and was thoroughly kneaded. The thus kneaded mixture was shaped and dried to obtain a mosquito coil.

EXAMPLE 43

1 part of the present compound (21) was dissolved in 20 parts of acetone. To the solution, 99 parts of 300 mesh diatomaceous earth was added. The resulting mixture was thoroughly stirred in a mortar and was then freed from acetone by vaporization to obtain a dust.

EXAMPLE 44

0.1 part of the present compound (22) was dissolved in kerosene to make 100 parts, whereby an oil spray was obtained.

EXAMPLE 45

0.2 part of the present compound (22), 0.2 part of phthalthrin, 13.6 parts of deodorized kerosene and 1 part of the emulsifier Atmos 300 were mixed together. The mixture was emulsified by addition of 50 parts of water, and then the same procedure as in Example 26 was effected to obtain a water based aerosol.

EXAMPLE 46

10 parts of the present compound (22), 10 parts of Sorpol SM-200 and 80 parts of xylene were mixed, stirred and dissolved together to obtain an emulsifiable concentrate.

The insecticidal effects of the present compositions obtained in the above manners will be shown with reference to the following test examples:

Test Example 1

The oil sprays obtained according to Examples 1, 3, 6, 8, 9, 14, 15, 16, 17, 19, 20, 21, 27, 29, 31, 33, 34, 35, 36, 40 and 44 were individually sprayed in an amount of 5 ml., using Campbel's turn table apparatus ["Soap and Sanitary Chemicals," vol. 14, No. 6, 119 (1938)]. After 20 seconds from the spray, the shutter was opened, and houseflies adults (about 100 flies per group) were exposed to the settling mist for 10 minutes and were then transferred to an observation cage. In the cage, the flies were fed and were allowed to stand for one day at room temperature. Thereafter, the number of killed flies was counted to be calculated the mortality thereof. The results were shown in Table 1.

TABLE 1

| Composition: Oil spray of Example— | Mortality (percent) |
|---|---|
| 1 (Containing 0.6% of compound (1)) | 84 |
| 3 (Containing 0.15% of compound (2)) | 79 |
| 6 (Containing 0.5% of compound (3)) | 66 |
| 8 (Containing 0.4% of compound (4)) | 63 |
| 9 (Containing 0.05% of compound (5)) | 95 |
| 14 (Containing 0.5% of compound (6)) | 86 |
| 15 (Containing 0.5% of compound (7)) and 2% of butoxide | 97 |
| 16 (Containing 0.3% of compound (8)) | 90 |
| 17 (Containing 0.6% of compound (9)) | 94 |
| 19 (Containing 0.4% of compound (10)) | 84 |
| 20 (Containing 0.5% of compound (11)) and 0.1% of DDVP | 89 |
| 21 (Containing 0.05% of compound (12)) | 80 |
| 27 (Containing 0.4% of compound (13)) and 0.1% of Sumithion | 97 |
| 29 (Containing 0.2% of compound (14)) | 98 |
| 31 (Containing 0.3% of compound (15)) | 80 |
| 33 (Containing 0.1% of compound (17)) | 75 |
| 34 (Containing 0.2% of compound (18)) | 66 |
| 35 (Containing 0.3% of compound (19)) | 73 |
| 36 (Containing 0.1% of compound (20)) | 85 |
| 40 (Containing 0.05% of compound (21)) | 78 |
| 44 (Containing 0.1% of compound (22)) | 81 |
| 0.2% Allethrin oil spray | 80 |

Test Example 2

The emulsifiable concentrates formulated according to Examples 2, 10, 18, 22, 28, 30, 32 and 39 and the wettable powder obtained according to Example 7 were individually diluted with water to 50,000 times. 2 l. of the resulting solution was charged in a styrol case of 23 cm. x 30 cm. with a depth of 6 cm., and about 100 larvae of northern house mosquitoes were liberated in the solution, whereby more than 90% of the larvae could be killed.

Test Example 3

Insecticidal effects on housefly adults of the aerosols formulated according to Examples 11, 26, 37, 41 and 45 were tested according to aerosol test method using Peet Grady's chamber [the method set forth in "Soap and Chemical Specialties, Blue Book" (1965)]. The results were as shown in Table 2.

TABLE 2

| Composition | Sprayed amount (g./1,000 ft.³) | Knock-down, percent | | | Mortality (percent) |
|---|---|---|---|---|---|
| | | 5 min. | 10 min. | 15 min. | |
| Aerosol of Example 11 | 3.02 | 19 | 59 | 83 | 62 |
| Water based aerosol of Example 26 | 2.99 | 18 | 48 | 78 | 59 |
| Aerosol of Example 37 | 3.24 | 20 | 54 | 83 | 74 |
| Aerosol of Example 41 | 3.04 | 19 | 52 | 85 | 71 |
| Water based aerosol of Example 45 | 3.10 | 12 | 47 | 76 | 65 |

About 20 northern house mosquito adults were liberated in a 70 cm.³ glass chamber. Each 1 g. of the mosquito coil formulated according to Examples 5, 13, 25, 38 and 42 were ignited on both ends and were individually placed at the center in the chamber. Thereafter, the number of knocked-down insects was counted with lapse of time to calculate KT 50 value (time required for 50% knock-down). The results were as shown in Table 3.

TABLE 3

Composition:                  KT 50 (min.sec.)
Mosquito coil of Example—
    5 containing 0.8% of compound (2) __ 7'50"
    13 containing 0.5% of compound (5) __ 7'20"
    25 containing 0.5% of compound (12) __ 8'20"
    38 containing 0.5% of compound (20) __ 6'40"
    42 containing 0.5% of compound (21) __ 7'00"

Test Example 5

A glass Petri dish of 14 cm. in inner diameter and 7 cm. in height was coated on the inner wall with butter, leaving at the lower part an uncoated portion of 1 cm. in width. Onto the bottom of the dish, the dusts formulated according to Examples 12, 24 and 43 were uniformly dusted individually in a proportion of 2 g./m.². Subsequently, 10 German cockroach adults were liberated in the dish and were contacted with the individual dusts for 30 minutes. After one day, more than 90% of the cockroaches were knocked-down and after 3 days, more than 90% of the insects were killed.

Test Example 6

10 l. of water was poured into a 14 l. polypropylene bucket. Into the water, 1 g. of the granular preparation obtained according to Example 4 was charged. After one day, about 100 full grown larvae of morthern house mosquitoes were liberated in the water, whereby more than 90% of the larvae could be killed within 24 hours.

Test Example 7

In 1/50,000 Wagner pots were grown rice plants which had elapsed 45 days after sowing. The emulsifiable concentrates obtained according to Examples 10, 30 and 46 and the wettable powder formulated according to Example 23 were individually diluted with water to 500 times, and were sprayed to the rice plants in a proportion of 10 ml. per pot. The pots were individually covered with wire net, and about 30 adults of green rice leaf hoppers were liberated in the wire net, whereby more than 90% of the insects could be killed after one day.

wherein $R_1$ is one member selected from the group consisting of lower alkyl, lower alkenyl, lower alkadienyl, benzyl, furfuryl, and thenyl groups and halogen atoms,

What is claimed is:

1. A thiophene derivative represented by the formula, $$\underset{S}{\overset{R_2\ R_3}{\underset{}{\boxed{\phantom{xx}}}}}-CH_2OC-CH-C\begin{subarray}{l}\diagup CH_3\\ \diagdown\\ O\ \ \ C\diagdown R_4\\ \ \ \ \ \ \ /\ \ \diagdown\\ \ \ \ CH_3\ \ CH_3\end{subarray}$$

each of said benzyl, furfuryl, and thenyl groups may have been nuclear substituted with a lower alkyl group; $R_2$ and $R_3$ are individually one member selected from the group consisting of hydrogen and halogen atoms and lower alkyl groups, or $R_1$ and $R_2$ together are a 4,5-tetramethylene group; and $R_4$ is one member selected from the group consisting of hydrogen and a methyl group.

2. A thiophene derivative of claim 1 wherein $R_1$ is selected from the group consisting of methyl, ethyl, thenyl, and benzyl groups, and halogen atoms.

3. A thiophene derivative of claim 2 wherein $R_2$ and $R_3$ are each selected from the group consisting of hydrogen, halogen, methyl group, and ethyl group.

4. A thiophene derivative of claim 3 wherein $R_4$ is hydrogen.

5. A thiophene derivative of claim 3 wherein $R_2$ and $R_3$ are each selected from the group consisting of hydrogen and methyl group.

6. A thiophene derivative of claim 3 wherein $R_1$ and $R_2$ are halogen, $R_3$ is selected from the groups consisting of halogen and hydrogen, and $R_4$ is hydrogen.

References Cited

UNITED STATES PATENTS 3,047,611    7/1962    Moore et al. _____ 260—468

OTHER REFERENCES

Morrison et al.: Org. Chem. (Allyn & Bacon, Boston, 1965), pp. 482-3.

HENRY R. JILES, Primary Examiner

C. M. SHURKO, Assistant Examiner

U.S. Cl. X.R.

260—332.3, 332.5, 468, 501.1, 514, 544, 546; 424—275